Figure 1:
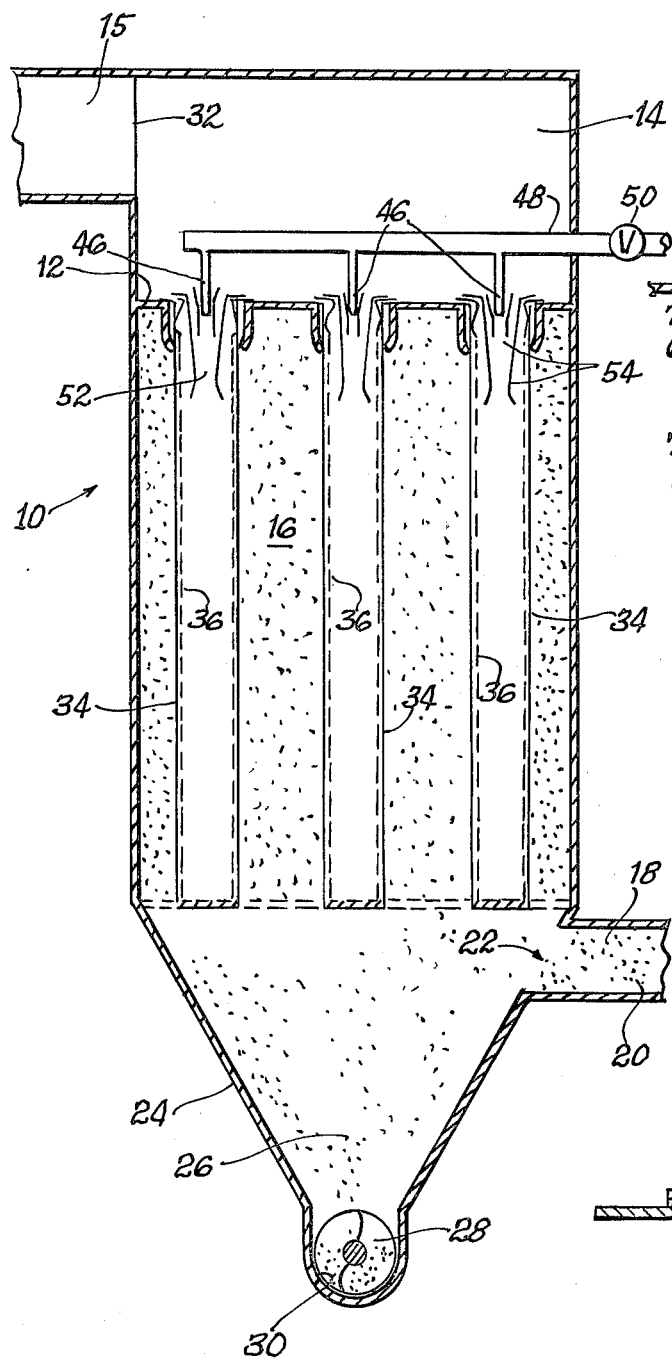

United States Patent [19]

Hammond et al.

[11] 4,220,459
[45] Sep. 2, 1980

[54] FILTER DEVICE WITH TOP ACCESS TO FILTER BAG

[75] Inventors: Ronald W. Hammond; J. Howard Conley, both of Allison Park, Pa.

[73] Assignee: Wheelabrator-Frye Inc., Hampton, N.H.

[21] Appl. No.: 951,773

[22] Filed: Oct. 16, 1978

Related U.S. Application Data

[63] Continuation of Ser. No. 776,665, Mar. 11, 1977, abandoned, which is a continuation of Ser. No. 555,413, Mar. 5, 1975, abandoned.

[51] Int. Cl.² .................................. B01D 46/02
[52] U.S. Cl. .................................. 55/341 R; 55/377; 55/379
[58] Field of Search .................. 55/376–379, 55/341 R

[56] References Cited

U.S. PATENT DOCUMENTS

| | | | |
|---|---|---|---|
| 1,390,966 | 9/1921 | Beth | 55/377 X |
| 1,813,896 | 7/1931 | Paine | 55/378 X |
| 2,143,664 | 1/1939 | Snyder | 55/DIG. 26 X |
| 2,335,963 | 12/1943 | Ponselle | 55/319 X |
| 2,503,568 | 4/1950 | Timm | 55/379 X |
| 2,805,731 | 9/1957 | Kron | 55/377 X |
| 3,177,636 | 4/1965 | Jensen | 55/378 UX |
| 3,401,505 | 9/1968 | Ballard | 55/379 X |
| 3,747,307 | 7/1973 | Peshina et al. | 55/379 |
| 3,777,458 | 12/1973 | Dence | 55/377 X |
| 3,830,042 | 8/1974 | MacDonnell | 55/379 X |
| 3,853,509 | 12/1974 | Leliaert | 55/379 X |
| 3,876,402 | 4/1975 | Bundy et al. | 55/379 X |
| 3,937,621 | 2/1976 | Gravley | 55/378 X |

Primary Examiner—Kathleen J. Prunner
Attorney, Agent, or Firm—McDougall, Hersh & Scott

[57] ABSTRACT

A filter device of the bag type in which the bags extend from openings through a cell plate and in which the invention is addressed to means for releasably mounting the filter bag to the cell plate with access from the clean side of the filter bags and includes a relatively rigid ring member secured to the open end of the filter bag and a cup member fixed to the cell plate for receiving the ring supporting end portion of the bag in gripping relation therein.

2 Claims, 3 Drawing Figures

FILTER DEVICE WITH TOP ACCESS TO FILTER BAG

This application is a continuation of application Ser. No. 776,665, filed Mar. 11, 1977, now abandoned, which is a continuation of application Ser. No. 555,413, filed Mar. 5, 1975, now abandoned.

This invention relates to a filter device for the removal of suspended solids from air, vapor or other gases and it relates more particularly to a filter device which makes use of a plurality of filter tubes or bags mounted for the passage of gaseous medium therethrough from an ingoing side to the opposite outgoing side whereby the separated solids collect to form a filter cake on the ingoing side.

Removal of the collected solids is periodically required when the filter cake builds up to such dimension as to cause higher than desired resistance to normal filter flow.

A number of techniques have been developed for filter cake removal to clean the bags for more efficient operation.

In one technique, which is finding increased acceptance in commercial practice, use is made of a jet of air introduced through the end of the filter tube in communication with the outgoing side, and in a direction opposite filter flow, but with a force sufficient to effect counter-flow with corresponding sudden flexure of the filter bag which operates to loosen the filter cake for filter cake removal. The dislodged portion of the filter cake is allowed gravitationally to fall downwardly into the hopper at the base of the collecting chamber for removal from the filter device.

In the construction of a filter device which makes use of the jet pulse technique for cleaning the filter bags, the filter bags are suspended from a cell plate to extend into the dirty gas plenum chamber with the cell plate separating the clean gas plenum chamber from the bag house.

Notwithstanding the ability automatically to clean the filter elements without the need for removal of the filter tubes or bags, there are occasions where it is desirable to effect filter bag replacement because of bag wear, damage to the bags, or excessive clogging of a portion of the filter bag, or merely for replacement with bags more suitable for use in the treatment of a particular gaseous medium or under different temperature or environmental conditions.

For the most part, such removal or replacement of filter bags has required entry into the space within the bag house area for access to the means for mounting the bags onto the tube sheet. The space within the bag house is not only limited by reason of the many bags suspended therein, but the mounting means may be beyond the reach of the operator and access thereto is sometimes difficult.

It is an object of this invention to provide a simple and efficient means for removal and replacement of filter bags without the need for access to the bags or tubes from within the bag house or the dirty side of the bags; in which the filter bags can be mounted in a manner securely to position the filter bags in position of use without the need for special tools; in which removal or replacement of filter bags can be carried out easily and rapidly without the need for highly skilled labor, and whereby removal or replacement of one or all of the bags can be accomplished with equal efficiency.

Figure 2:
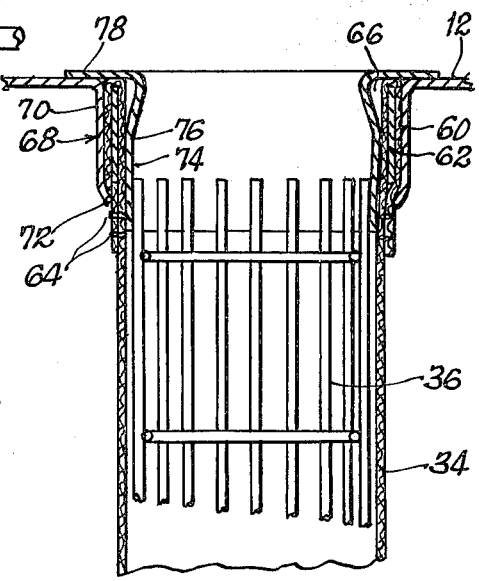
Figure 3:
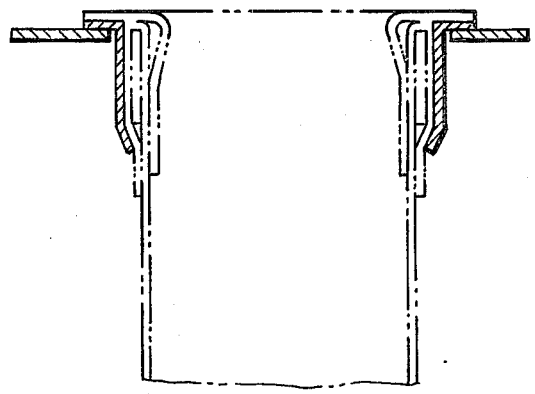

These and other objects and advantages of this invention will hereinafter appear and for purposes of illustration, but not of limitation, embodiments of the invention are shown in the accompanying drawing in which FIG. 1 is a schematic elevational view which illustrates a filter device that operates on the jet pulse principle for filter cake removal;

FIG. 2 is a sectional elevational view showing a means, embodying the features of this invention, for mounting the upper open end of a filter tube onto the cell plate in the filter device of the type shown in FIG. 1; and FIG. 3 is a partial sectional elevational view showing an alternative mounting means.

It will be apparent that the concepts of this invention are addressed chiefly to the means for mounting the filter bags in position of use, in a filter device, for easy access to enable removal or replacement thereof. The invention will be defined with reference to employment in a filter device which makes use of the jet pulse principle of operation for filter cake removal.

Referring now to FIG. 1 of the drawings, the filter apparatus comprises an enclosed filter housing 10 subdivided by a horizontally disposed cell plate 12 into an upper clean gas plenum chamber 14 and a lower inlet chamber 16 into which the gaseous material 18 to be cleaned or processed, as for the removal of suspended solids 20, is introduced through an inlet 22 in communication with the inlet plenum chamber 16.

The lower portion of the filter housing 10 is formed with convergent walls 24 to define a collecting hopper 26 which is adapted to receive separated solid particles which fall gravitationally upon separation from the ingoing side of the filter bags upon removal. A screw conveyor 28 may operate within a trough 30 in the bottom end portion of the hopper 26 for displacement of collected solids from the filter housing. Other means, such as a rotary air lock, can be used for removal of the collected solids.

An outlet opening 32 communicates the clean gas plenum chamber 14 with the exhaust 15 of cleaned air into the atmosphere or the exhaust of clean gas for subsequent processing.

Suspended into the inlet plenum chamber 16 are one and preferably a plurality of vertically disposed filter elements 34 in the form of elongate porous members, such as bags formed of such fibers as cotton, silk, hemp, or other natural fibers, glass, asbestos and the like inorganic fibers, or fibers marketed under the name Orlon, Dacron (polyester), Nylon (polyamide) or the like manmade fibers, or combinations thereof, or woven or felted fabrics of fibers of the type described above, but it is preferred to fabricate the filter bag of fibrous fabrics characterized by good wear resistance, good chemical resistance, and fibers which are resistant to high temperature to enable use in the treatment of gases exhausted at elevated temperature from such chemical operations as cement plants, aluminum plants, and the like. The tubular filter member is usually retained in its tubular shape by means of a suitable internal support, such as an open tubular frame 36 formed of wire screening or the like rigid, highly foraminous material, and referred to in the trade as a filter cage.

Extending downwardly into the open end of the filter tube is a source of primary gas in the form of a nozzle 46 connected via manifold 48 to a source of supply of high pressure primary gas, with suitable valve means 50 for regulating the frequency and duration of the burst of high pressure primary gas from the nozzle 46.

In axial alignment with the nozzle and preferably concentrically arranged therewith is a venturi 52 dimensioned to provide an annular open space between the nozzle 46 and the venturi section 52 for inflow of secondary gas. The nozzle or venturi section 52 is provided at its lower end with a convergent section 54 which operates to increase the effective force and pressure of the jet of gas issuing from the nozzle 46 beyond that in normal filter flow whereby instantaneous reversal of flow is effected to cause a whipping action on the filter bags for loosening the filter cake. A series of telescoping nozzles and venturis may be provided, as illustrated in FIG. 1, with the outlet from one venturi operating as the nozzle for the next venturi. This operates to accentuate the burst of air issuing from the venturi for filter cake removal.

A means, representative of the features of this invention, for removably mounting the filter bag for suspension from the cell plate is illustrated in FIG. 2. The upper end of the filter bag 34 is formed with a hem 60 in which a ring member 62 is entrapped for permanent retention therein, as by stitching 64. The ring member 62 is preferably in the form of a flexible, preferably resilient member, such as of spring metal, plastics and the like, dimensioned to have an outer wall to wall dimension which is approximately equal to and preferably slightly greater than the wall to wall dimension of the filter bag. The inner wall to wall dimension of the ring member is not significant but it is desirable to have it correspond somewhat to the wall to wall dimension of the bag.

The cell plate 12 is provided with the usual openings 66 for registry with the open end of the filter bag 34 to communicate the interior of the outgoing or clean side of the filter bag with the clean air plenum chamber 14. Each of the openings in the cell plate is provided with a cup member 68 in the form of a short tubular section 70 having an inner wall to wall dimension or diameter which corresponds to the outer wall to wall dimension or diameter of the upper end of the filter bag in which the ring 62 is secured. The tubular section is formed with a lip 72 extending inwardly from the lower end for a distance to define an opening. The length of the tubular section 70 should be at least as great as the length of the axial dimension of the ring member and preferably slightly greater.

The cup member 68 can be formed as an element separate and apart from the cell plate 12 with means for attachment thereto to extend downwardly through the opening 66 as shown in FIG. 3. It is preferred, however, to form the cup member as an integral part of the cell plate to define the openings, as illustrated in FIG. 2. The sealing effect between the end of the filter bag and the cup is achieved primarily by the sewn in ring which presses the bag against the cup wall.

The assembly for removably mounting the filter bag may be enhanced by a retainer member 74 which may form an extension fastened to the top of the cage 36 or an integral part thereof. The retainer member 74 is in the form of a ring member, such as may be formed of a plurality of circumferentially spaced apart resilient wires or of a solid ring arranged to define a circle having a diameter corresponding to the inner diameter of the filter bag, preferably, though not necessarily, with portions 76 offset inwardly to define a spaced relation therebetween which may be slightly greater than the diameter of the upper end portion of the filter bag in which the ring member 62 is retained. The upper end portion of the retainer 74 is formed with an outwardly extending flanged portion 78 which is adapted to overlie the portion of the coil plate 12 immediately surrounding the opening 66.

To mount the filter bag, the bag is lowered through the opening 66 from the top side of the cell plate 12 until the ring supported end portion is received within the cup member 68 in gripping relation with the lower end portion of the ring member at rest on the inwardly extending lip 72. The ring may be deformed for insertion and then allowed to snap into conformity with the cup to effect a seal. Thereafter, the cage is inserted from the top side of the cell plate 12 and through the opening 66 into the interior of the filter bag until the ring end portion of the bag is grasped between the retainer end portion and the cup member. When it is desired to effect removal of the filter bag for replacement or for repair, the aforementioned operations are reversed in that the retainer and cage are first withdrawn by access from the top side of the cell plate. Thereafter the ring supported end portion of the filter bag is disengaged from the cup member and withdrawn through the opening from the top side of the cell plate, or allowed to drop into the dust hopper.

It will be understood that the same elements may be employed in a reversal of the system to locate the cell plate lowermost in the housing whereby the filter tube will extend upwardly from the openings in the cell plate, into the bag house, with the inlet to the dirty gas plenum chamber in the upper portion of the housing and the outlet in communication with the clean gas plenum chamber located in the lower portion of the housing, and with the nozzles for the jet pulse extending upwardly for projection of the jet of high pressure air upwardly through the opening into the interior of the filter tube, as illustrated in FIG. 1b of U.S. Pat. No. 3,606,736.

By way of modification, the retainer member, when used, may comprise an expansible ring member in the form of a spring member or a spring pressed member to effect a resilient engagement of the ring end portion of the filter bag between the tubular section of the cup and the retainer. Use can also be made of an extensible ring member sewn in and retained by a rigid cage top.

It will be understood that changes may be made in the details of construction, arrangement and operation without departing from the spirit of the invention, especially as defined in the following claims.

We claim:

1. A multiple bag filter comprising a housing, a horizontally disposed cell plate separating the housing into an upper clean gas plenum chamber and a bag house, said housing having an inlet opening in communication with the bag house and an outlet opening in communication with the clean gas plenum chamber, a plurality of circular openings through the cell plate, a plurality of filter bags open at one end, a resilient ring member fixed in the open end portion of each filter bag, a tubular member extending downwardly from each opening having an inner wall to wall dimension corresponding to the outer wall to wall dimension of the end portion of a filter bag with the ring member, an annular lip extending inwardly from the lower end portion of each tubular member to define an opening thereby to enable a bag to be raised upwardly through the opening in the cell plate for removal from the top side of the cell plate and to be displaced downwardly through the opening in the cell plate from the top side of the cell plate until the ring member end portion is received in gripping relation within the tubular member and the lowermost portion of the ring member is at rest on the inwardly extending annular lip such that the bag is mounted to the cell plate, a wire cage for each filter bag having a retainer member in the form of a ring member secured to the top of the cage having a diameter corresponding to the inner diameter of a filter bag and an annular flange portion extending outwardly from the upper end portion for a distance greater than the openings in the cell plate whereby the wire cage and retainer member are each slideable through an opening and through the interior of a filter bag until the flange portion comes to rest on the portion of the cell plate surrounding the opening whereby the end portion of the filter bag becomes confined between the retainer member and the tubular member when in the assembled relation.

2. A multiple bag filter as claimed in claim 1 in which the tubular member comprises a member separate and apart from the cell plate and in which the tubular member is dimensioned to have an outside diameter less than the diameter of the opening through the cell plate, and in which the said tubular member includes an annular flange extending outwardly from the upper end for a distance greater than the diameter of the opening through the cell plate so as to provide a means for attachment of the tubular member to the cell plate.

* * * * *

UNITED STATES PATENT OFFICE
CERTIFICATE OF CORRECTION

Patent No. 4,220,459    Dated September 2, 1980

Inventor(s) Ronald W. Hammond and J. Howard Conley

It is certified that error appears in the above-identified patent and that said Letters Patent are hereby corrected as shown below:

Col. 4, line 5, cancel "coil" and substitute -- cell -- .

Signed and Sealed this

Twenty-fifth Day of November 1980

[SEAL]

*Attest:*

*Attesting Officer*

SIDNEY A. DIAMOND

*Commissioner of Patents and Trademarks*